US010677918B2

(12) United States Patent
Ding et al.

(10) Patent No.: US 10,677,918 B2
(45) Date of Patent: Jun. 9, 2020

(54) SYSTEMS AND METHODS FOR IMPROVED ANGULAR RESOLUTION IN MULTIPLE-INPUT MULTIPLE-OUTPUT (MIMO) RADAR (71) Applicant: Analog Devices, Inc., Norwood, MA (US)

(72) Inventors: Xueru Ding, Newton, MA (US); Michael S. Allen, Needham, MA (US)

(73) Assignee: Analog Devices, Inc., Norwood, MA (US)

( * ) Notice: Subject to any disclaimer, the term of this patent is extended or adjusted under 35 U.S.C. 154(b) by 390 days.

(21) Appl. No.: 15/445,188

(22) Filed: Feb. 28, 2017

(65) Prior Publication Data

US 2018/0246204 A1    Aug. 30, 2018

(51) Int. Cl.
*G01S 13/93* (2020.01)
*G01S 13/931* (2020.01)
*G01S 7/03* (2006.01)
*G01S 13/87* (2006.01)
*H01Q 1/32* (2006.01)
*H01Q 21/06* (2006.01)
(Continued)

(52) U.S. Cl.
CPC .............. *G01S 13/931* (2013.01); *G01S 7/03* (2013.01); *G01S 13/42* (2013.01); *G01S 13/58* (2013.01); *G01S 13/87* (2013.01); *H01Q 1/3233* (2013.01); *H01Q 21/061* (2013.01); *G01S 2013/0254* (2013.01); *G01S 2013/93271* (2020.01)

(58) Field of Classification Search
CPC .......... G01S 13/42; G01S 13/58; G01S 13/87; G01S 13/931; G01S 2013/0254; G01S 2013/9375; G01S 7/03; H01Q 1/3233; H01Q 21/061

USPC ......................................................... 342/107
See application file for complete search history.

(56) References Cited

U.S. PATENT DOCUMENTS 6,137,434 A    10/2000   Tohya et al.
7,898,480 B2   3/2011    Ebling et al.
(Continued)

FOREIGN PATENT DOCUMENTS

DE   102017210137 A1   12/2017
WO   WO-8908933 A1     9/1989

OTHER PUBLICATIONS

"German Application Serial No. 102017210137(A1), Search Report Dated Jul. 5, 2018", w/ English Translation, 10 pgs.

*Primary Examiner* — Timothy A Brainard
(74) *Attorney, Agent, or Firm* — Schwegman Lundberg & Woessner, P.A.

(57) ABSTRACT

A MIMO radar transceiver assembly includes a plurality of transceiver circuit regions and a plurality of antennas. The plurality of antennas include a first transmit antenna coupled to a first transceiver circuit region among the plurality of transceiver circuit regions, a first receive antenna coupled to the first transceiver circuit region, a second transmit antenna coupled to a second transceiver circuit region among the plurality of transceiver circuit regions, and a second receive antenna coupled to the second transceiver circuit region. At least one of the second transmit antenna and the second receive antenna is interleaved between the first transmit antenna and the first receive antenna. Interleaving of the antennas can increase virtual aperture and angular resolution of the radar system without increasing physical dimensions of the transceiver assembly.

20 Claims, 5 Drawing Sheets (51) Int. Cl.
   *G01S 13/42*   (2006.01)
   *G01S 13/58*   (2006.01)
   G01S 13/02    (2006.01)

(56) References Cited

U.S. PATENT DOCUMENTS

| | | |
|---|---|---|
| 8,289,203 B2 | 10/2012 | Culkin et al. |
| 8,797,969 B1 | 8/2014 | Harel et al. |
| 8,873,585 B2 | 10/2014 | Oren et al. |
| 9,130,613 B2 | 9/2015 | Oren et al. |
| 9,203,160 B2 | 12/2015 | Blech et al. |
| 9,258,052 B2 | 2/2016 | George et al. |
| 9,300,378 B2 | 3/2016 | Harel |
| 9,310,478 B2 | 4/2016 | Gross et al. |
| 9,448,302 B2 | 9/2016 | Schoor et al. |
| 9,461,371 B2 | 10/2016 | Kuonanoja |
| 2011/0074620 A1* | 3/2011 | Wintermantel ......... G01S 7/032 342/70 |
| 2012/0223852 A1 | 9/2012 | Gross et al. |
| 2015/0198705 A1 | 7/2015 | Schoor et al. |
| 2015/0253419 A1* | 9/2015 | Alland ...................... G01S 7/02 342/385 |
| 2015/0253420 A1 | 9/2015 | Alland |
| 2015/0295628 A1 | 10/2015 | Rambach II, et al. |
| 2016/0131742 A1 | 5/2016 | Schoor |
| 2016/0131752 A1 | 5/2016 | Jansen et al. |
| 2016/0223643 A1 | 8/2016 | Li |
| 2016/0365631 A1* | 12/2016 | Huang .................. H04B 7/0413 |
| 2017/0352958 A1* | 12/2017 | Lee ........................ H01Q 21/08 |

* cited by examiner

SYSTEMS AND METHODS FOR IMPROVED ANGULAR RESOLUTION IN MULTIPLE-INPUT MULTIPLE-OUTPUT (MIMO) RADAR

FIELD OF THE DISCLOSURE

The present disclosure relates to the field of multiple-input multiple-output (MIMO) radar.

BACKGROUND

A MIMO radar system is a type of phased-array radar system having a phased-array of transmit antennas and a phased-array of receive antennas that transmits multiple probing signals via its phased-array of transmit antennas. The multiple transmitted probing signals can be either correlated or uncorrelated with one another.

SUMMARY OF THE DISCLOSURE

In a typical automotive MIMO radar system having multiple transceiver circuits, the transceiver circuits and their respective associated transmit and receive antennas can be arranged side by side, and all transmit and receive antennas associated with each of the transceiver circuits can be grouped together with their respective transceiver circuit in one respective area, so that there are no intermingling of transmit and receive antennas associated with different transceiver circuits. For example, in a typical dual-transceiver automotive radar system, two transceiver components including transceiver circuits and their respective antennas can be arranged side-by-side. In these typical automotive MIMO radar systems, a possible maximum span of the virtual aperture is defined by the spatial convolution among the transmit (TX) and the receive (RX) antennas, e.g., by the distance between two furthest outside transmit (TX) antennas and the distance between two furthest outside receive (RX) antennas associated with the transceiver circuits. In addition, the angular resolution of the radar system's sensing and imaging is defined by the virtual aperture size. The virtual aperture size is limited also by how much space is available for each of the respective areas having a transceiver and associated transmit and receive antennas.

In various embodiments of a MIMO radar system as discussed herein, a plurality of transceiver circuits and their respective associated transmit and receive antennas are arranged to co-mingle the transmit and/or receive antennas of different ones of the plurality of transceiver circuits together within a common area, for example, by interleaving a transmit or receive antenna associated with one transceiver of the plurality of transceiver circuits between two transmit and/or receive antennas associated with a different transceiver of the plurality of transceiver circuits. The co-mingling and interleaving can be accomplished using various arrangements of the respective transceiver circuits and their respective transmit and receive antennas. As an illustrative example, in the plane of a transceiver and antenna assembly, such interleaving can be accomplished by orienting one transceiver component including a transceiver circuit and respective TX and RX antennas such that the TX and RX antennas of the one transceiver component are interleaved with TX and RX antennas of a second transceiver component. For example, in the plane of the assembly, the TX and RX antennas of the one transceiver component can point in a downward direction toward the second transceiver component, while the TX and RX antennas of the second transceiver component can point in an upward direction toward the second transceiver component. Use of "downward" and "upward" refer to relative orientations of the antennas in the plane of the assembly.

By this co-mingling of the transmit and/or receive antennas of different ones of the plurality of transceiver circuits together within a common area, a physical distance between different antennas of the plurality of transmit or receive antennas associated with a single one of the plurality of transceiver circuits can be increased without increasing the overall area containing the plurality of transceiver circuits compared to typical automotive MIMO radar systems. This increased physical distance of the embodiments facilitates an increased angular resolution performance compared to typical automotive MIMO radar systems. The increased angular resolution performance of the embodiments can be as much as nearly double the angular resolution performance of typical automotive MIMO radar systems without requiring a corresponding doubling of the size of the surface dimensions of the antenna and transceiver assembly. As a trade-off of the increased angular resolution performance, target angular detection ambiguities of the embodiments can be reduced compared to typical automotive MIMO radar systems without increasing the physical dimensions of a transceiver assembly.

According to an embodiment, a transceiver assembly comprises a plurality of transceiver circuit regions and a plurality of antennas. The plurality of antennas include a first transmit antenna coupled to a first transceiver circuit region among the plurality of transceiver circuit regions, a first receive antenna coupled to the first transceiver circuit region, a second transmit antenna coupled to a second transceiver circuit region among the plurality of transceiver circuit regions, and a second receive antenna coupled to the second transceiver circuit region. At least one of the second transmit antenna and the second receive antenna is interleaved between the first transmit antenna and the first receive antenna.

According to an embodiment, a method of multiple-input multiple-output (MIMO) radar transmission comprises transmitting a first radar signal by a first transmit antenna coupled to a first transceiver circuit region, transmitting a second radar signal by a second transmit antenna coupled to a second transceiver circuit region, receiving a return radar signal by a first receive antenna coupled to the first transceiver circuit region, and receiving the return radar signal by a second receive antenna coupled to the second transceiver circuit region. The second transmit antenna transmits the second radar signal from a position interleaved between the first transmit antenna and the first receive antenna and/or the second receive antenna receives the return radar signal from a position interleaved between the first transmit antenna and the first receive antenna.

According to an embodiment, a vehicle comprises a MIMO radar system including a transceiver assembly and a control circuit. The transceiver assembly includes a plurality of transceiver circuit regions and a plurality of antennas. The plurality of antennas include a first antenna coupled to a first transceiver circuit region among the plurality of transceiver circuit regions, a second antenna coupled to the first transceiver circuit region, and a third antenna coupled to a second transceiver circuit region among the plurality of transceiver circuit regions. The third antenna is interleaved between the first antenna and the second antenna. The control circuit is configured to determine a range between the vehicle and another object, a difference in velocity between the vehicle and the other object, and/or bearing information of the other object relative to the vehicle using information of signals transmitted and received by the plurality of antennas.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Any feature of any of the embodiments described herein can optionally be used in combination with any other embodiment. Also, any of the embodiments described herein can optionally include any subset of the components or features discussed herein.

Figure 1:
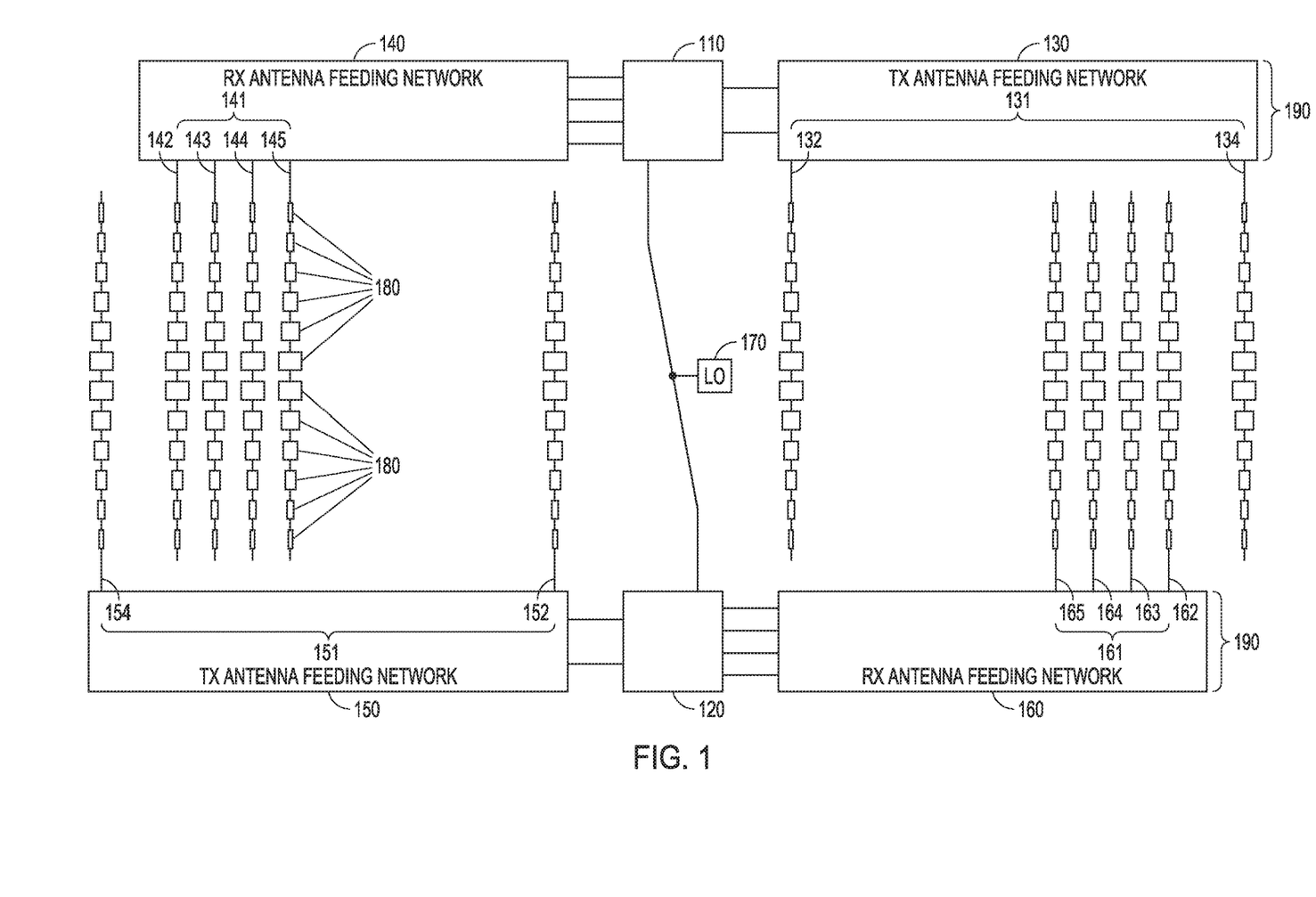
FIG. 1 is a diagram that illustrates a MIMO radar system including a pair of transceiver circuits coupled with corresponding transmit (TX) and receive (RX) antenna arrays, according to an embodiment.

FIG. 1 is a diagram that illustrates a MIMO radar system 100 including a plurality of transceiver circuits 110, 120 coupled with corresponding TX and RX antenna arrays 131, 141, 151, 161, according to an embodiment. The MIMO radar system 100 can include a phased-array radar system. The transceiver circuits 110, 120 can be communicatively coupled with a computing processor of a controller that controls the transceiver circuits 110, 120 to transmit radar signals according to transmit data and to obtain received data from radar signals received by the transceiver circuits 110, 120. The controller can be part of a MIMO automotive radar apparatus. The MIMO automotive radar apparatus can control the transceiver circuits 110, 120 to transmit and receive radar signals with radio frequencies within a specified frequency range, such as between about 3 MHz and 300 GHz. The transceiver circuits 110, 120 can be synchronized with a local oscillator signal output from a local oscillator 170. In various embodiments, the local oscillator 170 can be separate from both the transceiver circuits 110, 120 to transmit the local oscillator signal to both the transceiver circuits 110, 120 to maintain timing synchronization with one another. In various embodiments, the local oscillator 170 can be included in one of the transceiver circuits 110, 120 to output the local oscillator signal from the one of the transceiver circuits 110, 120 to the other of the transceiver circuits 110, 120 to maintain timing synchronization with one another. Thus, the one of the transceiver circuits 110, 120 can be set to output the local oscillator signal while the other of the transceiver circuits 110, 120 can be set to input the local oscillator signal, and both the transceiver circuits 110, 120 can be set to maintain timing synchronization with the local oscillator signal.

Each of the plurality of transceiver circuits 110, 120 can be disposed in a separate transceiver circuit region, and the separate transceiver circuit regions corresponding to the respective transceiver circuits 110, 120 can be separated from each other along a first axis that is different from a second axis along which the TX and RX antenna arrays 131, 141, 151, 161 are disposed and spaced apart from one another. In various embodiments, the first axis and the second axis can be perpendicular to each other. The TX and RX antenna arrays 131, 141 can be coupled to the transceiver circuit 110 by a TX antenna feeding network 130 and a RX antenna feeding network 140, respectively. The TX antenna feeding network 130 and the RX antenna feeding network 140 can be separated from one another by the transceiver circuit region corresponding to the transceiver circuit 110 disposed therebetween. The TX and RX antenna arrays 151, 161 can be coupled to the transceiver circuit 120 by a TX antenna feeding network 150 and a RX antenna feeding network 160, respectively.

The TX antenna feeding network 150 and the RX antenna feeding network 160 can be separated from one another by the transceiver circuit region corresponding to the transceiver circuit 120 disposed therebetween. The coupling arrangement of the transceiver circuit 110, the TX antenna feeding network 130, the RX antenna feeding network 140, and their corresponding TX and RX antennas can be matched to the coupling arrangement of the transceiver circuit 120, the TX antenna feeding network 150, the RX antenna feeding network 160, and their corresponding TX and RX antennas. Thus, the transceiver circuit 110, the TX antenna feeding network 130, the RX antenna feeding network 140, and their corresponding TX and RX antennas can be collectively a first instance of a single transceiver assembly 190 while the transceiver circuit 120, the TX antenna feeding network 150, the RX antenna feeding network 160, and their corresponding TX and LX antennas can be collectively a second instance of the single transceiver assembly 190.

The second instance of the single transceiver assembly 190 can be rotated 180 degrees compared to the orientation of the first instance of the single transceiver assembly 190. The first and second instances of the single transceiver assembly 190 can be disposed with their respective TX and LX antennas pointing toward one another and their respective transceiver circuit regions generally aligned with one another along an axis about perpendicular to an axis along which the TX and RX antennas are disposed. In this arrangement, the TX antenna feeding network 130 of the first instance of the single transceiver assembly 190 and the TX antenna feeding network 150 of the second instance of the single transceiver assembly 190 are separated along an axis that is different from an axis that separates the RX antenna feeding network 140 of the first instance of the single transceiver assembly 190 and the RX antenna feeding network 160 of the second instance of the single transceiver assembly 190. The axis along which the two RX antenna feeding networks of the MIMO radar system 100 are separated, the axis along which the two TX antenna feeding networks of the MIMO radar system 100 are separated, the axis along which the two transceiver circuit regions of the MIMO radar system 100 are separated, and the axis along which the TX and RX antennas of the MIMO radar system 100 are disposed can all be different from one another, and can form a superimposed plus (+) and cross (x) shape (e.g., an 8-point starburst shape).

The TX and RX antenna feeding networks 130, 140, 150, 160 can each include a substrate having electrically conductive paths for each respective antenna coupled with the TX and RX antenna feeding networks 130, 140, 150, 160 on a same substrate layer. The substrates of the TX and RX antenna feeding networks 130, 140, 150, 160 can include electrically conductive paths for each of a plurality of positions at which an antenna can be coupled with the TX and RX antenna feeding networks 130, 140, 150, 160, although fewer antennas can be coupled in any particular instance. Thus, a single antenna feeding network design or different instances of a single part can be utilized for each of the TX and RX antenna feeding networks 130, 140, 150, 160, by changing connections between the single antenna feeding network design or part and the antennas and transceiver circuits associated with each respective TX and RX antenna feeding network 130, 140, 150, 160. The transceiver circuits 110, 120, the TX and RX antenna feeding networks 130, 140, 150, 160, and the TX and RX antenna arrays 131, 141, 151, 161 can be disposed on one or more printed circuit boards (PCBs), polymer thick film flex circuits, low-temperature co-fired ceramic substrate, or other substrate of a transceiver assembly. Although the illustrated embodiments of the TX and RX antenna feeding networks 130, 140, 150, 160 can include passive electrical transmission lines, this should not be construed as limiting, as in various embodiments, the TX and RX antenna feeding networks 130, 140, 150, 160 can include active components, e.g., electrical signal amplifier circuits, to amplify signals to be transmitted on the respective TX and RX antennas. In various embodiments, the TX and RX antenna feeding networks 130, 140, 150, 160 can include different transmission line technologies, e.g., microstrip transmission lines, co-planar waveguides, striplines, or other electrically conducting technologies.

The TX antenna array 131 can include a plurality of TX antennas, for example, two TX antennas 132 and 134. There can be one wiring connection between the transceiver circuit 110 and the TX antenna feeding network 130 for each of the plurality of TX antennas in the TX antenna array 131. In various embodiments, each of the plurality of TX antennas can be disposed in one of a plurality of preset positions along a length of the TX antenna feeding network 130 to establish a preset spacing between each of the plurality of TX antennas in the TX antenna array 131. In the embodiment illustrated in FIG. 1, the TX antenna 132 is disposed at an end of the TX antenna feeding network 130 closest to the transceiver circuit 110, and the TX antenna 134 is disposed at an opposite end of the TX antenna feeding network 130 furthest from the transceiver circuit 110. The TX antenna feeding network 130 can have matched conducting line lengths for each connection between the transceiver circuit 110 and a corresponding one of the plurality of TX antennas in the TX antenna array 131 such that transmission time delays introduced by the TX antenna feeding network 130 are the same for different ones of the plurality of TX antennas coupled with the TX antenna feeding network 130. Thus, the transmission time delays introduced by the TX antenna feeding network 130 can be uniform across a plurality of the TX antennas in the TX antenna array 131 regardless of their respective positions along the length of the TX antenna feeding network 130 or their physical distances from the transceiver circuit 110. Each of the TX antennas 132, 134 can be disposed parallel to one another on a same side of the TX antenna feeding network 130, and each of the TX antennas 132, 134 can include a plurality of antenna elements 180 spaced apart and coupled with one another along an electrical conducting line traced from the TX antenna feeding network 130 toward the RX antenna feeding network 160, but not coupled with the RX antenna feeding network 160. Each of the plurality of antenna elements 180 can be sized differently from others of the plurality of antenna elements 180. For example, in the illustrated embodiment, antenna elements 180 close to the center of an individual TX antenna are larger than antenna elements 180 close to the ends of the individual TX antenna. The antenna elements 180 can be spaced evenly along the TX antenna. The sizing and spacing of the antenna elements 180 along an individual TX antenna can help to optimize beamforming performance of the MIMO radar system 100.

The RX antenna array 141 can include a plurality of RX antennas, for example, four RX antennas 142, 143, 144, and 145. There can be one wiring connection between the transceiver circuit 110 and the RX antenna feeding network 140 for each of the plurality of RX antennas in the RX antenna array 141. In various embodiments, each of the plurality of RX antennas can be disposed in one of a plurality of preset positions along a length of the RX antenna feeding network 140 to establish a preset spacing between each of the plurality of RX antennas in the RX antenna array 141. In the embodiment illustrated in FIG. 1, the RX antennas 142, 143, 144, 145 are disposed in positions adjacent one another at an end of the RX antenna feeding network 140 furthest from the transceiver circuit 110, and at a uniform spacing between one another. The RX antenna feeding network 140 can have matched conducting line lengths for each connection between the transceiver circuit 110 and a corresponding one of the plurality of RX antennas in the RX antenna array 141 such that transmission time delays introduced by the RX antenna feeding network 140 are the same for different ones of the plurality of RX antennas coupled with the RX antenna feeding network 140. Thus, the transmission time delays introduced by the RX antenna feeding network 140 can be uniform across a plurality of the RX antennas in the RX antenna array 141 regardless of their respective positions along the length of the RX antenna feeding network 140 or their physical distances from the transceiver circuit 110. Each of the RX antennas 142, 143, 144, 145 can be disposed parallel to one another on a same side of the RX antenna feeding network 140, and each of the RX antennas 142, 143, 144, 145 can include a plurality of antenna elements 180 spaced apart and coupled with one another along an electrical conducting line traced from the RX antenna feeding network 140 toward the TX antenna feeding network 150, but not coupled with the TX antenna feeding network 150. Each of the plurality of antenna elements 180 can be sized differently from others of the plurality of antenna elements 180. For example, in the illustrated embodiment, antenna elements 180 close to the center of an individual RX antenna are larger than antenna elements 180 close to the ends of the individual RX antenna. The antenna elements 180 can be spaced evenly along the RX antenna. The sizing and spacing of the antenna elements 180 along an individual RX antenna can help to optimize beamforming performance of the MIMO radar system 100.

The transceiver circuit 120 can be coupled with a TX antenna feeding network 150 and a RX antenna feeding network 160. The TX antenna feeding network 150 can be coupled with the TX antenna array 151. The RX antenna feeding network 160 can be coupled with the RX antenna array 161.

The TX antenna array 151 can include a plurality of TX antennas, for example, two TX antennas 152 and 154. There can be one wiring connection between the transceiver circuit 120 and the TX antenna feeding network 150 for each of the plurality of TX antennas in the TX antenna array 151. In various embodiments, each of the plurality of TX antennas can be disposed in one of a plurality of preset positions along a length of the TX antenna feeding network 150 to establish a preset spacing between each of the plurality of TX antennas in the TX antenna array 151. In the embodiment illustrated in FIG. 1, the TX antenna 152 is disposed at an end of the TX antenna feeding network 150 closest to the transceiver circuit 120, and the TX antenna 154 is disposed at an opposite end of the TX antenna feeding network 150 furthest from the transceiver circuit 120. The TX antenna feeding network 150 can have matched conducting line lengths for each connection between the transceiver circuit 120 and a corresponding one of the plurality of TX antennas in the TX antenna array 151 such that transmission time delays introduced by the TX antenna feeding network 150 are the same for different ones of the plurality of TX antennas coupled with the TX antenna feeding network 150. Thus, the transmission time delays introduced by the TX antenna feeding network 150 can be uniform across a plurality of the TX antennas in the TX antenna array 151 regardless of their respective positions along the length of the TX antenna feeding network 150 or their physical distances from the transceiver circuit 120. Each of the TX antennas 152, 154 can be disposed parallel to one another on a same side of the TX antenna feeding network 150, and each of the TX antennas 152, 154 can include a plurality of antenna elements 180 spaced apart and coupled together along an electrical conducting line traced from the TX antenna feeding network 150 toward the RX antenna feeding network 140, but not coupled with the RX antenna feeding network 140. Each of the plurality of antenna elements 180 can be sized differently from others of the plurality of antenna elements 180. For example, in the illustrated embodiment, antenna elements 180 close to the center of an individual TX antenna are larger than antenna elements 180 close to the ends of the individual TX antenna. The antenna elements 180 can be spaced evenly along the TX antenna. The sizing and spacing of the antenna elements 180 along an individual TX antenna can help to optimize beamforming performance of the MIMO radar system 100.

The RX antenna array 161 can include a plurality of RX antennas, for example, four RX antennas 162, 163, 164, and 165. There can be one wiring connection between the transceiver circuit 120 and the RX antenna feeding network 160 for each of the plurality of RX antennas in the RX antenna array 161. In various embodiments, each of the plurality of RX antennas can be disposed in one of a plurality of preset positions along a length of the RX antenna feeding network 160 to establish a preset spacing between each of the plurality of RX antennas in the RX antenna array 161. In the embodiment illustrated in FIG. 1, the RX antennas 162, 163, 164, 165 are disposed in positions adjacent one another at an end of the RX antenna feeding network 160 furthest from the transceiver circuit 120, and at a uniform spacing between one another. The RX antenna feeding network 160 can have matched conducting line lengths for each connection between the transceiver circuit 120 and a corresponding one of the plurality of RX antennas in the RX antenna array 161 such that transmission time delays introduced by the RX antenna feeding network 160 are the same for different ones of the plurality of RX antennas coupled with the RX antenna feeding network 160. Thus, the transmission time delays introduced by the RX antenna feeding network 160 can be uniform across a plurality of the RX antennas in the RX antenna array 161 regardless of their respective positions along the length of the RX antenna feeding network 160 or their physical distances from the transceiver circuit 120. Each of the RX antennas 162, 163, 164, 165 can be disposed parallel to one another on a same side of the RX antenna feeding network 160, and each of the RX antennas 162, 163, 164, 165 can include a plurality of antenna elements 180 spaced apart and coupled together along an electrical conducting line traced from the RX antenna feeding network 160 toward the TX antenna feeding network 130, but not coupled with the TX antenna feeding network 130. Each of the plurality of antenna elements 180 can be sized differently from others of the plurality of antenna elements 180. For example, in the illustrated embodiment, antenna elements 180 close to the center of an individual RX antenna are larger than antenna elements 180 close to the ends of the individual RX antenna. The antenna elements 180 can be spaced evenly along the RX antenna. The sizing and spacing of the antenna elements 180 along an individual RX antenna can help to optimize beamforming performance of the MIMO radar system 100.

A plurality of the TX antennas and RX antennas of the MIMO radar system 100 can be disposed parallel to one another and can be disposed in a row such that a virtual line perpendicular to the plurality of TX antennas and RX antennas of the MIMO radar system 100 can intersect all of the plurality of TX antennas and RX antennas of the MIMO radar system 100. The antennas coupled with the transceiver circuit 110 and the antennas coupled with the transceiver circuit 120 can be interleaved with one another. One or more of the plurality of TX and RX antennas of the transceiver circuit 120 can be interleaved between two or more of the TX and RX antennas of the transceiver circuit 110. Likewise, one or more of the plurality of TX and RX antennas of the transceiver circuit 110 can be interleaved between two or more of the TX and RX antennas of the transceiver circuit 120. The RX antennas of the RX antenna array 161 can be disposed between or interleaved between the TX antennas of the TX antenna array 131. The RX antennas of the RX antenna array 141 can be disposed between or interleaved between the TX antennas of the TX antenna array 151. The TX antenna 132 of the TX antenna array 131 and the TX antenna 152 of the TX antenna array 151 can be disposed between or interleaved between the RX antennas of the RX antenna array 141 and the RX antennas of the RX antenna array 161. The TX antenna 132 coupled with the transceiver circuit 110 can be disposed between or interleaved between the TX antenna 152 and the RX antenna array 161 coupled with the transceiver circuit 120. The TX antenna 152 coupled with the transceiver circuit 120 can be disposed between or interleaved between the TX antenna 132 and the RX antenna array 141 coupled with the transceiver circuit 110.

A distance between one of the plurality of TX antennas of the TX antenna array 131 coupled with the transceiver circuit 110 and one of the plurality of RX antennas of the RX antenna array 161 coupled with the transceiver circuit 120 can be less than a distance between one of the plurality of RX antennas of the RX antenna array 161 coupled with the transceiver circuit 120 and one of the plurality of TX antennas of the TX antenna array 151 coupled with the transceiver circuit 120. Likewise, a distance between one of the plurality of TX antennas of the TX antenna array 151 coupled with the transceiver circuit 120 and one of the plurality of RX antennas of the RX antenna array 141 coupled with the transceiver circuit 110 can be less than a distance between one of the plurality of RX antennas of the RX antenna array 141 coupled with the transceiver circuit 110 and one of the plurality of TX antennas of the TX antenna array 131 coupled with the transceiver circuit 110.

One of the plurality of TX antennas of the TX antenna array 131 coupled with the transceiver circuit 110 can be disposed closer to one end of an assembly of the MIMO radar system 100 than any other of the plurality of antennas of the MIMO radar system 100, while one of the plurality of TX antennas of the TX antenna array 151 coupled with the transceiver circuit 120 can be disposed closer to an opposite end of the assembly of the MIMO radar system 100 than any other of the plurality of antennas of the MIMO radar system 100.

A distance between adjacent TX antennas of the TX antenna array 131 can be greater than a distance between adjacent RX antennas of the RX antenna array 141. Likewise, a distance between adjacent TX antennas of the TX antenna array 151 can be greater than a distance between adjacent RX antennas of the RX antenna array 161. Furthermore, a distance between adjacent TX antennas of the TX antenna array 151 can be greater than a distance between adjacent RX antennas of the RX antenna array 141, and a distance between adjacent TX antennas of the TX antenna array 131 can be greater than a distance between adjacent RX antennas of the RX antenna array 161.

While two TX antennas and four RX antennas coupled to each of the transceiver circuits 110, 120 are shown in the MIMO radar system 100 of FIG. 1 in a particular arrangement, this should not be construed as limiting. In various embodiments, any number and arrangement of TX and RX antennas can be coupled to each of a plurality of synchronized transceiver circuits to facilitate various beamforming characteristics of the MIMO radar system. While the MIMO radar system 100 of FIG. 1 illustrates four TX and RX antenna arrays, this should also not be construed as limiting, as in various embodiments, a MIMO radar system can include any number of TX and RX antenna arrays, for example, three, four, or eight TX and RX antenna arrays. In addition, each antenna can have any number of antenna elements.

Figure 2:
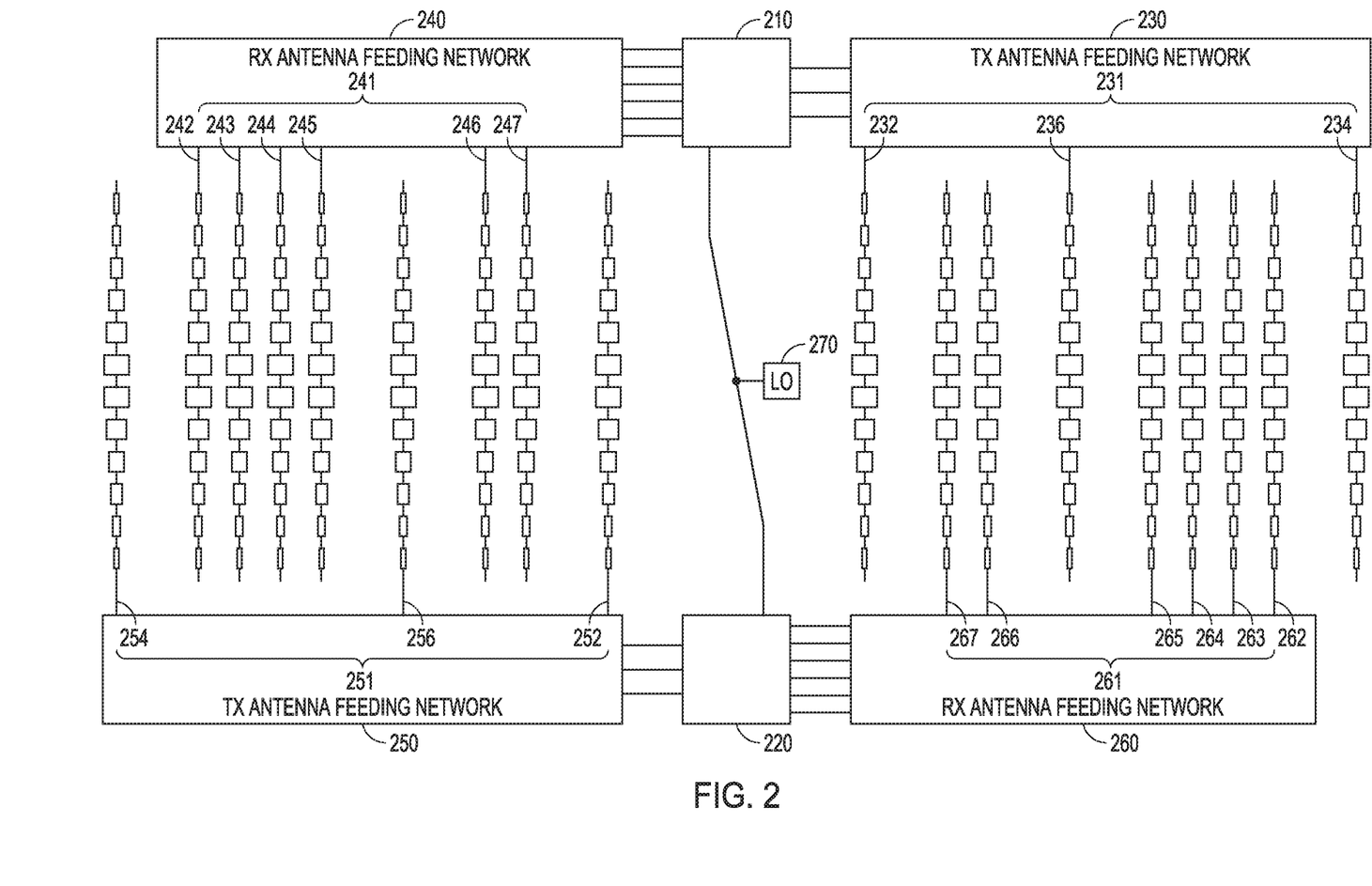
FIG. 2 is a diagram that illustrates a MIMO radar system including a pair of transceiver circuits coupled with corresponding TX and RX antenna arrays, according to an embodiment.

FIG. 2 is a diagram that illustrates a MIMO radar system 200 including a pair of transceiver circuits 210, 220 coupled with corresponding TX and RX antenna arrays 231, 241, 251, 261, according to an embodiment. The MIMO radar system 200 can be an embodiment of the MIMO radar system 100, with a different arrangement of TX and RX antennas in the TX and RX antenna arrays 231, 241, 251, 261. The MIMO radar system 200 can include a phased-array radar system with design and performance characteristics similar to those of the MIMO radar system 100. The transceiver circuits 210, 220 can be embodiments of the transceiver circuits 110, 120, and can be synchronized with a local oscillator 270 output from one transceiver circuit 110 to the other transceiver circuit 120 to maintain timing synchronization with one another. The local oscillator 270 can be an embodiment of the local oscillator 170. The TX and RX antenna arrays 231, 241 can be coupled to the transceiver circuit 210 by a TX antenna feeding network 230 and a RX antenna feeding network 240, respectively. The TX and RX antenna arrays 251, 261 can be coupled to the transceiver circuit 220 by a TX antenna feeding network 250 and a RX antenna feeding network 260, respectively. The TX antenna feeding networks 230 and 250 can be embodiments of the TX antenna feeding networks 130 and 150. The RX antenna feeding networks 240 and 260 can be embodiments of the RX antenna feeding networks 140 and 160. The transceiver circuit 210, the TX antenna feeding network 230, the RX antenna feeding network 240, and their corresponding TX and RX antennas can be collectively a first instance of a single transceiver assembly 290 while the transceiver circuit 220, the TX antenna feeding network 250, the RX antenna feeding network 260, and their corresponding TX and RX antennas can be collectively a second instance of the single transceiver assembly 290. The single transceiver assembly 290 can be an embodiment of the single transceiver assembly 190.

The TX antenna array 231 can include TX antennas 232, 234 that are embodiments of the TX antennas 132, 134. In addition, the TX antenna array 231 can include a third TX antenna 236 disposed between the TX antennas 232, 234 coupled with the ends of the TX antenna feeding network 230. Likewise, the TX antenna array 251 can include TX antennas 252, 254 that are embodiments of the TX antennas 152, 154. In addition, the TX antenna array 251 can include a third TX antenna 256 disposed between the TX antennas 252, 254 coupled with the ends of the TX antenna feeding network 250. The TX antenna 236 can be disposed at a midpoint between the TX antennas 232, 234, while the TX antenna 256 can be disposed at a midpoint between the TX antennas 252, 254. In various embodiments, the TX antennas 232, 234, 236, 252, 254, 256 can be disposed at regular intervals from one end of an assembly of the MIMO radar system 200 to the other end, and thus the physical distances between neighboring TX antennas 232, 234, 236, 252, 254, 256 can be the same.

The RX antenna array 241 can include RX antennas 242, 243, 244, 245 that are embodiments of the RX antennas 142, 143, 144, 145. In addition, the RX antenna array 241 can include additional RX antennas 246, 247 disposed between the RX antennas 242, 243, 244, 245 and the end of the RX antenna feeding network 240 closest to the transceiver circuit 210. Likewise, the RX antenna array 261 can include RX antennas 262, 263, 264, 265 that are embodiments of the RX antennas 162, 163, 164, 165. In addition, the RX antenna array 261 can include additional RX antennas 266, 267 disposed between the RX antennas 262, 263, 264, 265 and the end of the RX antenna feeding network 260 closest to the transceiver circuit 220. The RX antennas 246, 247 can be disposed between the TX antennas 252, 256, while the RX antennas 266, 267 can be disposed between the TX antennas 232, 236. In various embodiments, a physical distance between the RX antennas 246, 247 can be the same as a physical distance between neighboring RX antennas of the group of RX antennas 242, 243, 244, 245, and a distance between the RX antenna 245 and the RX antenna 246 can be a multiple of the distance between the RX antennas 246, 247. Likewise, a physical distance between the RX antennas 266, 267 can be the same as a physical distance between neighboring RX antennas of the group of RX antennas 262, 263, 264, 265, and a distance between the RX antenna 265 and the RX antenna 266 can be a multiple of the distance between the RX antennas 266, 267.

The antennas of the TX and RX antenna arrays 231, 241, 251, 261 can include a plurality of antenna elements 280 spaced apart and coupled with one another along electrical conducting lines of their respective antennas. The plurality of antenna elements 280 can be embodiments of the antenna elements 180.

Figure 3A:
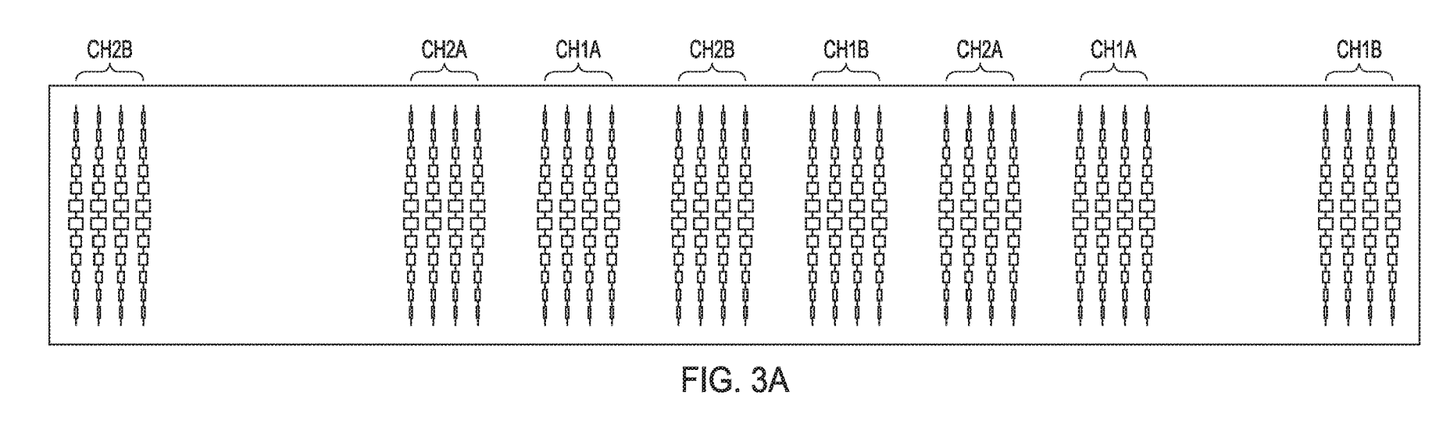
FIGS. 3A and 3B are diagrams that illustrate a virtual aperture size of a two-transceiver MIMO radar system according to an embodiment (FIG. 3A) relative to a virtual aperture size of a typical two-transceiver MIMO radar system (FIG. 3B).
Figure 3B:
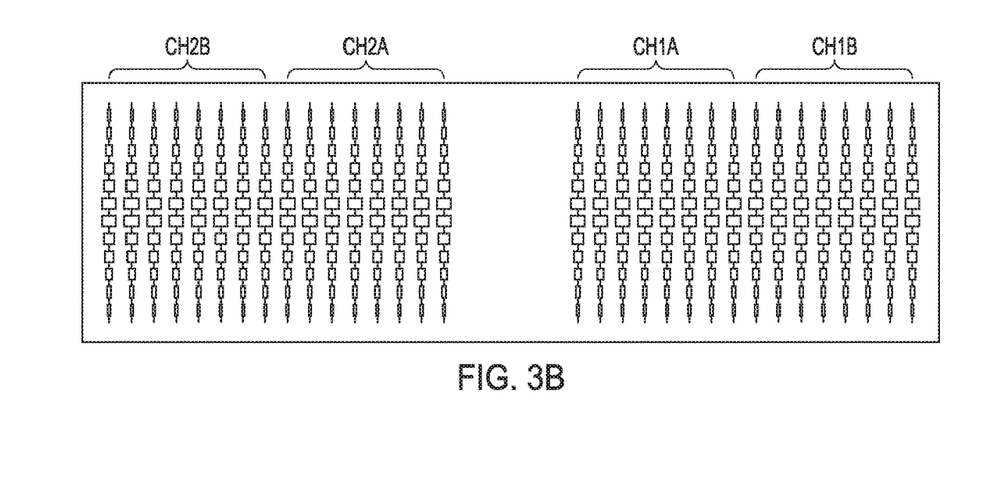

FIGS. 3A and 3B are diagrams that illustrate a virtual aperture size of a two-transceiver MIMO radar system according to the embodiment of FIG. 1 (FIG. 3A) relative to a virtual aperture size of a typical two-transceiver MIMO radar system (FIG. 3B). The x axes of both FIG. 3A and FIG. 3B correspond to same arbitrary units of virtual aperture size. The virtual aperture is determined by the arrangement of the TX and RX antennas. Portions of the virtual aperture corresponding to different two-way channels through the TX antennas and RX antennas associated with each of a first and a second transceiver circuit are indicated by the designations CH1A, CH1B, CH2A, and CH2B, where CH1A and CH2A correspond to TX antennas close to their respective transceiver circuit region (e.g., TX antennas 132, 152), and CH1B and CH2B correspond to TX antennas distant from their respective transceiver circuit region (e.g., TX antennas 134, 154). As illustrated in FIGS. 3A and 3B, the embodiments of two-transceiver MIMO radar systems discussed herein have increased virtual aperture sizes compared to typical two-transceiver MIMO radar systems.

For example, the channels designated CH1A can correspond to channels between TX-RX antenna pairs 132-142, 132-143, 132-144, 132-145, 132-162, 132-163, 132-164, and 132-165 of FIG. 1. Likewise, the channels designated CH1B can correspond to channels between TX-LX antenna pairs 134-142, 134-143, 134-144, 134-145, 134-162, 134-163, 134-164, and 134-165. Correspondingly, the channels designated CH2A can correspond to channels between TX-RX antenna pairs 152-142, 152-143, 152-144, 152-145, 152-162, 152-163, 152-164, and 152-165, and the channels designated CH2B can correspond to channels between TX-RX antenna pairs 154-142, 154-143, 154-144, 154-145, 154-162, 154-163, 154-164, and 154-165.

The physical location and spacing between TX antenna-RX antenna pairs determine the location of their corresponding channels in the virtual aperture chart. For example, the leftmost channel CH2B of the virtual aperture illustrated in FIG. 3A corresponds to the TX-RX antenna pair 154-142, and the rightmost channel CH1B corresponds to the TX-RX antenna pair 134-162. This can be determined by first determining the distances between each individual antenna and the left-most side of the combined TX and RX antenna arrays of FIG. 1, then determining a channel position value by adding the distance values of the two antennas of the pair of TX and RX antennas associated with each channel illustrated in FIG. 3A, and then placing the channel on the virtual aperture graph according to its determined channel position value. The distances can be measured in terms of unit distances d where one unit distance d corresponds to the distance between two closest adjacent antennas, e.g., RX antennas 142 and 143. Thus, the distances assigned to each of the TX and RX antennas illustrated in FIG. 1 are as follows, with each antenna being additionally referred to by a corresponding shorthand name:

TX2B (TX antenna 154): 0 d
RX1A (RX antenna 142): 2 d
RX1B (RX antenna 143): 3 d
RX1C (RX antenna 144): 4 d
RX1D (RX antenna 145): 5 d
TX2A (TX antenna 152): 12 d
TX1A (TX antenna 132): 17 d
RX2D (RX antenna 165): 24 d
RX2C (RX antenna 164): 25 d
RX2B (RX antenna 163): 26 d
RX2A (RX antenna 162): 27 d
TX1B (TX antenna 134): 29 d Following this methodology, the channels corresponding to each TX-RX antenna pair are placed on FIG. 3A from left to right in order according to the sum of the distance values of each pair's respective antennas, as follows:

TX2B-RX1A (0 d+2 d=2 d)
TX2B-RX1B (0 d+3 d=3 d)
TX2B-RX1C (0 d+4 d=4 d)
TX2B-RX1D (0 d+5 d=5 d)
TX2A-RX1A (12 d+2 d=14 d)
TX2A-RX1B (12 d+3 d=15 d)
TX2A-RX1C (12 d+4 d=16 d)
TX2A-RX1D (12 d+5 d=17 d)
TX1A-RX1A (17 d+2 d=19 d)
TX1A-RX1B (17 d+3 d=20 d)
TX1A-RX1C (17 d+4 d=21 d)
TX1A-RX1D (17 d+5 d=22 d)
TX2B-RX2D (0 d+24 d=24 d)
TX2B-RX2C (0 d+25 d=25 d)
TX2B-RX2B (0 d+26 d=26 d)
TX2B-RX2A (0 d+27 d=27 d)
TX1B-RX1A (29 d+2 d=31 d)
TX1B-RX1B (29 d+3 d=32 d)
TX1B-RX1C (29 d+4 d=33 d)
TX1B-RX1D (29 d+5 d=34 d)
TX2A-RX2D (12 d+24 d=36 d)
TX2A-RX2C (12 d+25 d=37 d)
TX2A-RX2B (12 d+26 d=38 d)
TX2A-RX2A (12 d+27 d=39 d)
TX1A-RX2D (17 d+24 d=41 d)
TX1A-RX2C (17 d+25 d=42 d)
TX1A-RX2B (17 d+26 d=43 d)
TX1A-RX2A (17 d+27 d=44 d)
TX1B-RX2D (29 d+24 d=53 d)
TX1B-RX2C (29 d+25 d=54 d)
TX1B-RX2B (29 d+26 d=55 d)
TX1B-RX2A (29 d+27 d=56 d)

The overall virtual aperture span of the virtual aperture shown in FIG. 3A is thus 56 d−2 d=54 d. FIG. 3B can be determined by the same methodology as FIG. 3A based on a typical conventional antenna arrangement, resulting in a virtual aperture span of 35 d.

The angular resolution of a two-transceiver MIMO radar system, e.g., according to the embodiment of FIG. 1, can be determined based on its corresponding virtual aperture. The angular resolution can be specified by the MIMO radar system's 3-dB bandwidth detection pattern, which can be expressed as $1.22\lambda/D$ (radians) in most cases, where $\lambda$ is the wavelength of the MIMO radar system's operating frequency, and D is the virtual antenna aperture size.

Figure 4:
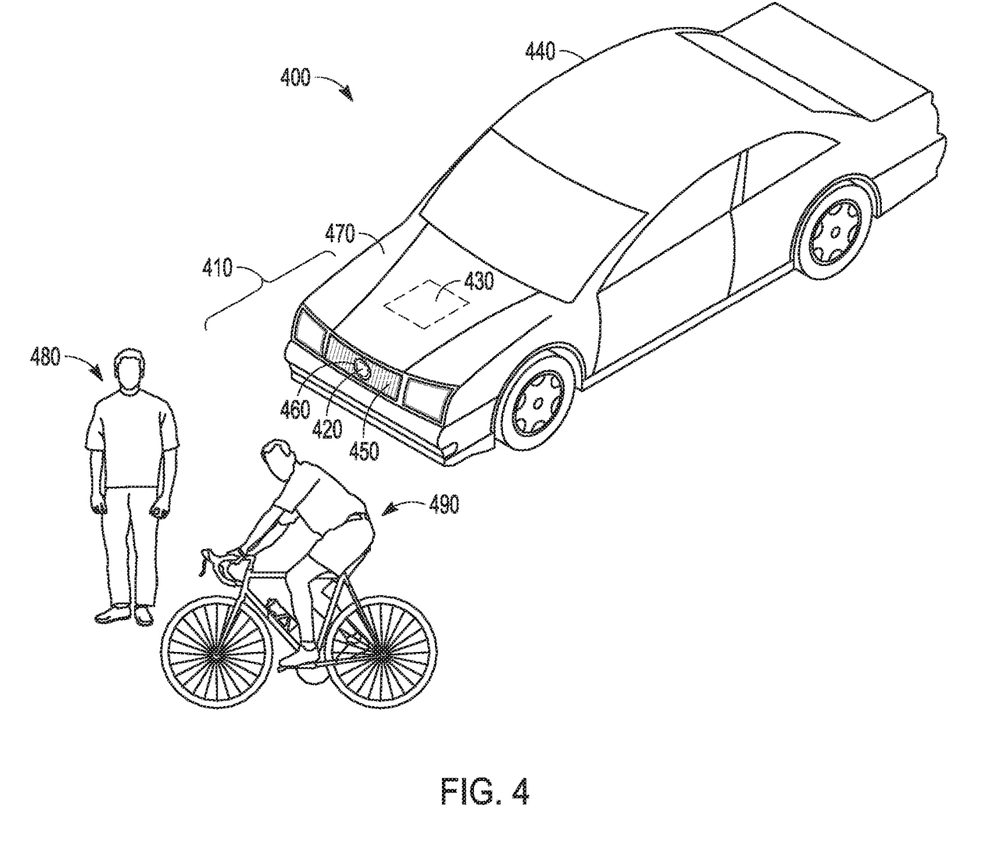
FIG. 4 is a diagram that illustrates a vehicle including a multiple-transceiver MIMO radar system having a transceiver assembly and a control circuit, according to an embodiment.

FIG. 4 is a diagram that illustrates a vehicle 400 including a multiple-transceiver MIMO radar system 410 having a transceiver assembly 420 and a control circuit 430, according to an embodiment. In various embodiments, the transceiver assembly 420 can include an embodiment of the MIMO radar system 100 or the MIMO radar system 200.

The vehicle 400 can be an automobile as illustrated in FIG. 4, but this should not be construed as limiting, as in various embodiments, the vehicle 400 can be a motorized or non-motorized vehicle, e.g., a motorcycle, a bicycle, a go-kart, an all-terrain vehicle (ATV), a boat, an airplane, a glider, a spacecraft, etc. The vehicle can also be more generally a carrier for the radar system 410, e.g., a mobile object that carries the radar system 410. The radar system 410 can be disposed in or behind a body 440 of the vehicle 400. For example, the transceiver assembly 420 can be disposed behind a grill 450 of the vehicle 400, and can also be disposed behind a logo, icon, or decorative plate 460 of the vehicle 400. The control circuit 430 can be disposed under an engine compartment hood 470 of the vehicle 400. For example, the control circuit 430 can be disposed together with an engine computer of the vehicle 400.

The control circuit 430 can be configured to determine at least one measured value using radar signals transmitted and received by the radar system 410, e.g., using information of signals transmitted and received by the plurality of antennas of the transceiver assembly 420. An example of the measured value includes a range or distance between the vehicle 400 and another object 480, 490. Although the object 480 is illustrated as a person and the object 490 is illustrated as a child riding a tricycle, this should not be construed as limiting, as in various embodiments, the object can include another vehicle, a building, a tree, a bridge, a guard rail, a sign, a berm, or any other obstacle that the vehicle 400 can potentially encounter while in motion. Another example of the measured value includes a difference in velocity between the vehicle 400 and the other object 480, 490. In addition, an example of the measured value includes bearing information of the other object 480, 490 relative to the vehicle 400.

Figure 5:
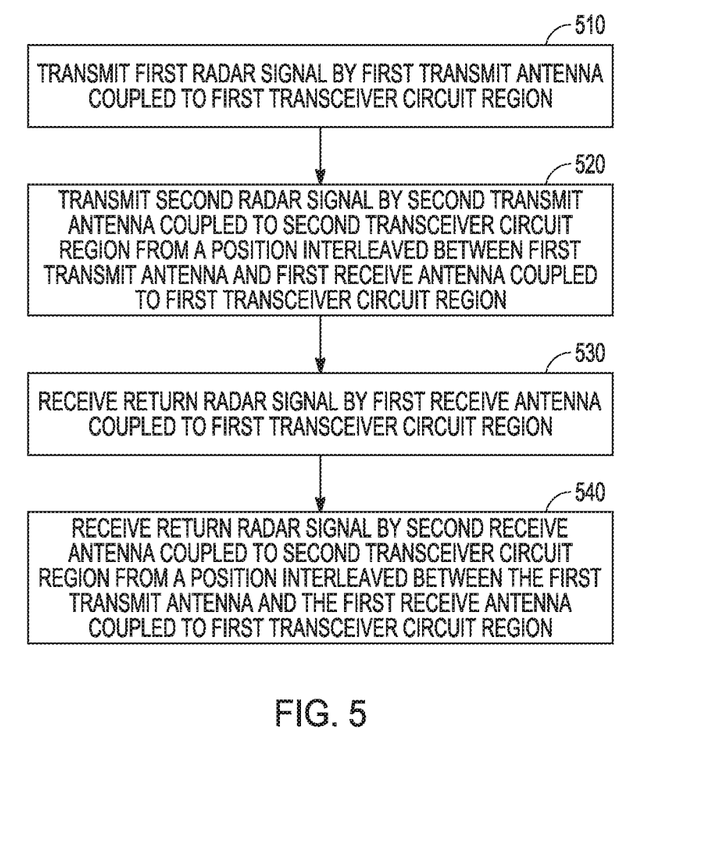
FIG. 5 is a flow diagram that illustrates a method of MIMO radar transmission, according to an embodiment.

FIG. 5 is a flow diagram that illustrates a method 500 of MIMO radar transmission, according to an embodiment. The method 500 can be performed using an embodiment of the MIMO radar system 100, the MIMO radar system 200, or the radar system 410, including a transceiver assembly having a plurality of transceiver circuits, a first transmit antenna, a second transmit antenna, a first receive antenna, and a second receive antenna. The first transmit antenna can be any of a plurality of transmit antennas of the transceiver assembly. The second transmit antenna can also be any of the plurality of transmit antennas of the transceiver assembly. The first receive antenna can be any of a plurality of receive antennas of the transceiver assembly. The second receive antenna can also be any of the plurality of receive antennas of the transceiver assembly. The method 500 can be performed according to computing instructions executed by a processor of a controller.

In an operation 510, a first radar signal is transmitted by the first transmit antenna coupled to a first transceiver circuit region. The first transceiver circuit region can include a first transceiver circuit. The first transmit antenna can transmit the first radar signal from a position at a distance from the second receive antenna that is less than a distance between the second receive antenna and the second transmit antenna.

In an operation 520, a second radar signal is transmitted by the second transmit antenna coupled to a second transceiver circuit region. The second transceiver circuit region can include a second transceiver circuit separate from the first transceiver circuit. The second transceiver circuit can be synchronized with the first transceiver circuit according to a common local oscillator signal. The second transmit antenna can be interleaved in position between the first transmit antenna and the first receive antenna. The second transmit antenna can be interleaved in position between the first transmit antenna and the second receive antenna. In various embodiments, a transmission time of the second radar signal can be delayed with respect to a transmission time of the first radar signal for the purpose of beamforming. Operation 510 and operation 520 can be performed simultaneously. Operation 530 and operation 540 can also be performed sequentially.

The first transmit antenna can transmit the first radar signal from a position that is closer to one side of the transceiver assembly than any other of a plurality of antennas coupled to the plurality of transceiver circuits, and the second transmit antenna can transmit the second radar signal from a position that is closer to an opposite side of the transceiver assembly than any other of the plurality of antennas.

The first transmit antenna can transmit the first radar signal from a position that is adjacent the second receive antenna and closer to one side of the transceiver assembly than any other of a plurality of antennas coupled to the plurality of transceiver circuits, and the second transmit antenna can transmit the second radar signal from a position that is adjacent the first receive antenna and closer to an opposite side of the transceiver assembly than any other of the plurality of antennas.

In an operation 530, a return radar signal is received by the first receive antenna coupled to the first transceiver circuit region. The return radar signal can be formed by one or more objects upon which the first and second transmitted radar signals bounce off of.

In an operation 540, the return radar signal is received by a second receive antenna coupled to the second transceiver circuit region. The second receive antenna can receive the return radar signal from a position interleaved between the first transmit antenna and the first receive antenna. The relative timing between receiving the return radar signal by the first receive antenna and receiving the return radar signal by the second receive antenna can be used to determine information about the one or more objects that the first and second transmitted radar signals bounce off of to form the return radar signal. Operation 530 and operation 540 be performed simultaneously.

VARIOUS NOTES & EXAMPLES

Each of the non-limiting examples described herein can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

For example, while the impedance elements and the switches are shown in one order between the input terminals and the summing nodes in the drawings, this should not be construed as limiting, because in various embodiments, the impedance elements and the switches can be disposed in a different order while maintaining the same functional performance, according to the understanding of one of ordinary skill in the art in view of the teachings herein. In addition, a single impedance element in the drawings can be replaced by a plurality of different impedance elements while maintaining a same functional performance, and a single switch in the figures can be replaced by a plurality of different switches while maintaining a same functional performance, according to the understanding of one of ordinary skill in the art in view of the teachings herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A transceiver assembly comprising:
a plurality of transceiver circuit regions synchronized in time using a shared oscillator circuit;
a plurality of antennas comprising:
a first transmit antenna coupled to a first transceiver circuit region among the plurality of transceiver circuit regions;
a first receive antenna coupled to the first transceiver circuit region;
a second transmit antenna coupled to a second transceiver circuit region among the plurality of transceiver circuit regions; and
a second receive antenna coupled to the second transceiver circuit region,
wherein at least the second transmit antenna is interleaved between the first transmit antenna and the first receive antenna so as to increase a virtual aperture and angular resolution of the transceiver assembly as compared to the transceiver assembly without such interleaving.

2. The transceiver assembly of claim 1, wherein the first transceiver circuit region and the second transceiver circuit region are separated along a first axis, and the plurality of antennas are separated along a second axis different from the first axis.

3. The transceiver assembly of claim 1, wherein at least one of the plurality of antennas comprises a plurality of antenna elements coupled with one another.

4. The transceiver assembly of claim 1, wherein a distance between the first transmit antenna and the second receive antenna is less than a distance between the second receive antenna and the second transmit antenna.

5. The transceiver assembly of claim 1, wherein the first transmit antenna is one of at least two transmit antennas coupled to the first transceiver circuit region where one of the at least two transmit antennas coupled to the first transceiver circuit region is closer than any other of the plurality of antennas to one side of the transceiver assembly, and the second transmit antenna is one of at least two transmit antennas coupled to the second transceiver circuit region where one of the at least two transmit antennas coupled to the second transceiver circuit region is closer than any other of the plurality of antennas to an opposite side of the transceiver assembly.

6. The transceiver assembly of claim 1, wherein the first transmit antenna is one of at least two transmit antennas coupled to the first transceiver circuit region and the second receive antenna is one of at least two receive antennas coupled to the second transceiver circuit region and one of the at least two transmit antennas coupled to the first transceiver circuit region and one of the at least two receive antennas coupled to the second transceiver region are adjacent each other and closer than any other of the plurality of antennas to one side of the transceiver assembly, and the second transmit antenna is one of at least two transmit antennas coupled to the second transceiver circuit region and the first receive antenna is one of at least two receive antennas coupled to the first transceiver circuit region and one of the at least two transmit antennas coupled to the second transceiver circuit region and one of the at least two receive antennas coupled to the first transceiver region are adjacent each other and closer than any other of the plurality of antennas to an opposite side of the transceiver assembly.

7. The transceiver assembly of claim 1, wherein:
the first transmit antenna is included among a first transmit antenna group comprising a plurality of transmit antennas;

the second receive antenna is included among a second receive antenna group comprising a plurality of receive antennas; and a distance between adjacent transmit antennas included in the first transmit antenna group is greater than a distance between adjacent receive antennas included in the second receive antenna group.

8. The transceiver assembly of claim 1, further comprising:
a first transmit antenna feeding network coupled between the first transceiver circuit region and the first transmit antenna;
a second transmit antenna feeding network coupled between the second transceiver circuit region and the second transmit antenna;
a first receive antenna feeding network coupled between the first transceiver circuit region and the first receive antenna; and
a second receive antenna feeding network coupled between the second transceiver circuit region and the second receive antenna.

9. The transceiver assembly of claim 8, wherein each of the first transmit antenna feeding network, second transmit antenna feeding network, first receive antenna feeding network, and second receive antenna feeding network comprise a substrate including conductive paths for each respective coupled antenna of the plurality of antennas on a same substrate layer.

10. The transceiver assembly of claim 8, wherein:
the first transmit antenna is included among a first transmit antenna group comprising a first plurality of transmit antennas, the first plurality of the transmit antennas coupled to the first transmit antenna feeding network;
the second transmit antenna is included among a second transmit antenna group comprising a second plurality of transmit antennas, the second plurality of the transmit antennas coupled to the second transmit antenna feeding network;
the first receive antenna is included among a first receive antenna group comprising a first plurality of receive antennas, the first plurality of the receive antennas coupled to the first receive antenna feeding network;
the second receive antenna is included among a second receive antenna group comprising a second plurality of receive antennas; the second plurality of the receive antennas coupled to the second receive antenna feeding network; and
the first and second receive antenna feeding networks are separated along a different axis than the first and second transmit antenna feeding networks.

11. The transceiver assembly of claim 10, wherein at least one of the plurality of antennas comprises a plurality of antenna elements coupled with one another.

12. The transceiver assembly of claim 10, wherein the first transmit antenna feeding network and the first receive antenna feeding network are coupled with the first transceiver circuit region on opposite sides of the first transceiver circuit region along a second axis different than a first axis along which the first transceiver circuit region and the second transceiver circuit region are separated.

13. The transceiver assembly of claim 1, further comprising a multiple-input multiple-output (MIMO) automotive radar apparatus coupled with transceiver circuits of the plurality of transceiver circuit regions.

14. The transceiver assembly of claim 1, wherein transceiver circuits of the plurality of transceiver circuit regions and the plurality of antennas are configured to transmit and receive radio frequencies within a frequency range between 3 MHz and 300 GHz.

15. A method of multiple-input multiple-output (MIMO) radar transmission, the method comprising:
transmitting a first radar signal by a first transmit antenna coupled to a first transceiver circuit region;
transmitting a second radar signal by a second transmit antenna coupled to a second transceiver circuit region that is timing synchronized with the first transceiver circuit region;
receiving a return radar signal by a first receive antenna coupled to the first transceiver circuit region; and
receiving the return radar signal by a second receive antenna coupled to the second transceiver circuit region,
wherein the second transmit antenna transmits the second radar signal from a position interleaved between the first transmit antenna and the first receive antenna so as to increase a virtual aperture and angular resolution of a transceiver assembly comprising the first and second transceiver circuit regions as compared to the first and second transceiver circuit regions without such interleaving.

16. The method of claim 15, wherein the first transmit antenna transmits the first radar signal from a position at a distance from the second receive antenna that is less than a distance between the second receive antenna and the second transmit antenna.

17. The method of claim 15, wherein the first transmit antenna is one of at least two transmit antennas coupled to the first transceiver circuit region where one of the at least two transmit antennas coupled to the first transceiver circuit region transmits the first radar signal from a position that is closer than any other of a plurality of antennas coupled to the first transceiver circuit region or the second transceiver circuit region to one side of a transceiver assembly, and the second transmit antenna is one of at least two transmit antennas coupled to the second transceiver circuit region where one of the at least two transmit antennas coupled to the second transceiver circuit region transmits the second radar signal from a position that is closer than any other of the plurality of antennas to an opposite side of the transceiver assembly.

18. The method of claim 15, wherein the first transmit antenna is one of at least two transmit antennas coupled to the first transceiver circuit region and one of the at least two transmit antennas coupled to the first transceiver circuit region transmits the first radar signal from a position that is adjacent one of at least two receive antennas coupled to the second transceiver region including the second receive antenna and closer than any other of a plurality of antennas coupled to the first transceiver circuit region or the second transceiver circuit region to one side of a transceiver assembly, and the second transmit antenna is one of at least to transmit antennas coupled to the second transceiver circuit region and one of the at least two transmit antennas coupled to the second transceiver circuit region transmits the second radar signal from a position that is adjacent one of at least two receive antennas coupled to the first transceiver region including the first receive antenna and closer than any other of the plurality of antennas to an opposite side of the transceiver assembly.

19. The method of claim 15, further comprising determining a distance between the first and second receive antennas and an object that reflects the first and second radar signals to generate the return radar signal.

20. A vehicle comprising a multiple-input multiple-output (MIMO) radar system including:
- a transceiver assembly comprising:
- a plurality of transceiver circuit regions synchronized in time using a shared oscillator circuit;
- a plurality of antennas comprising:
- a first transmit antenna coupled to a first transceiver circuit region among the plurality of transceiver circuit regions;
- a first receive antenna coupled to the first transceiver circuit region; and
- a second transmit antenna coupled to a second transceiver circuit region among the plurality of transceiver circuit regions, the second transmit antenna being interleaved between the first transmit antenna and the first receive antenna so as to increase a virtual aperture and angular resolution of the transceiver assembly as compared to the transceiver assembly without such interleaving; and
- a control circuit configured to determine at least one measured value comprising a range between the vehicle and an object, a difference in velocity between the vehicle and the object, and bearing information of the object relative to the vehicle using information of signals transmitted and received by the plurality of antennas.

* * * * *

UNITED STATES PATENT AND TRADEMARK OFFICE
CERTIFICATE OF CORRECTION

PATENT NO.           : 10,677,918 B2
APPLICATION NO.      : 15/445188
DATED                : June 9, 2020
INVENTOR(S)          : Ding et al.

Page 1 of 1

It is certified that error appears in the above-identified patent and that said Letters Patent is hereby corrected as shown below:

In the Claims

In Column 17, Line 46, in Claim 10, delete "antennas;" and insert --antennas,-- therefor In Column 18, Line 55, in Claim 18, delete "to" and insert --two-- therefor Signed and Sealed this
First Day of December, 2020

Andrei Iancu
*Director of the United States Patent and Trademark Office*